No. 840,090. PATENTED JAN. 1, 1907.
L. C. SCHNEIDER.
APPARATUS FOR HARDENING THE TEETH OF CARD CLOTHING.
APPLICATION FILED MAY 8, 1906.
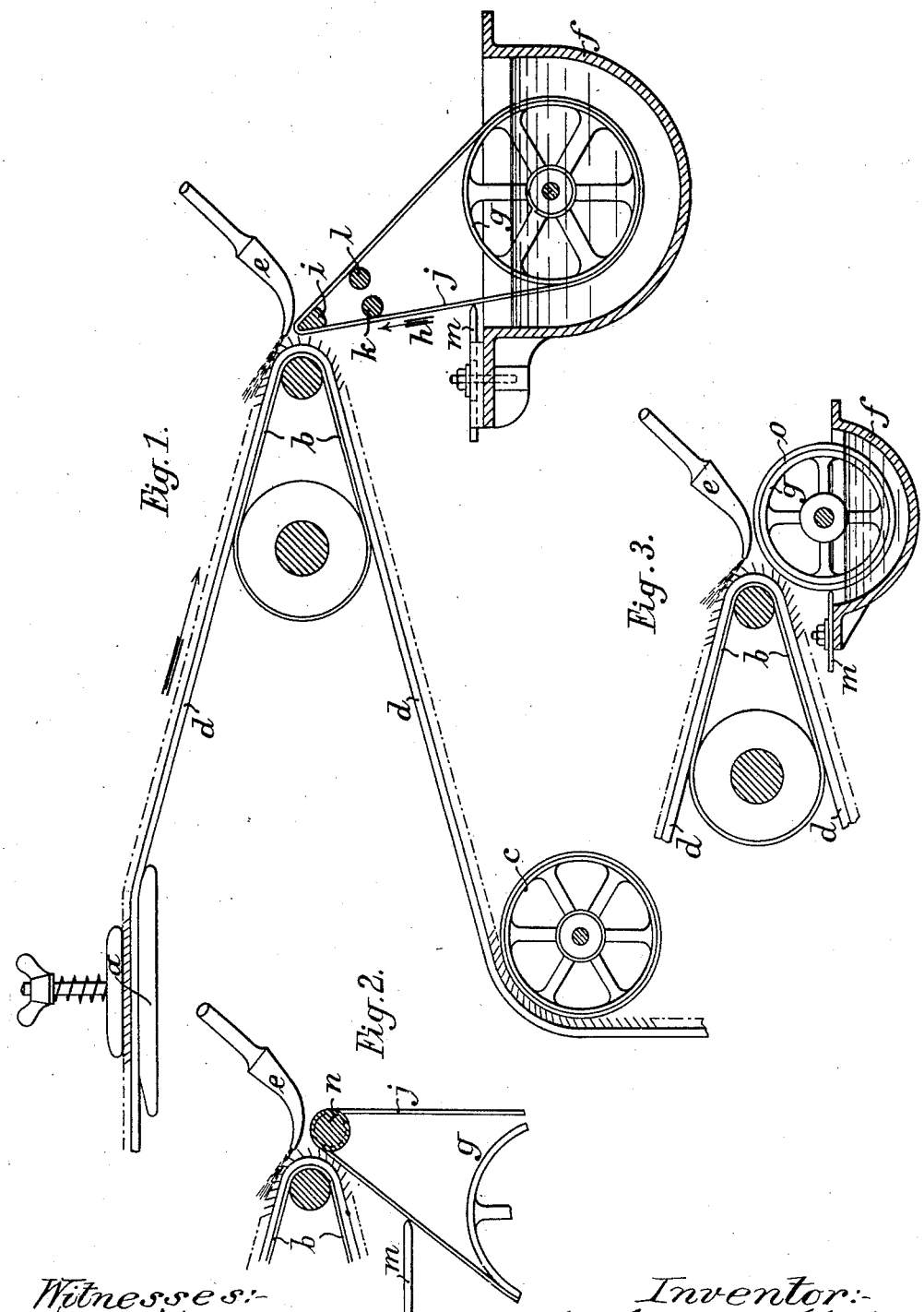

UNITED STATES PATENT OFFICE.

LOUIS CONSTANTIN SCHNEIDER, OF MITTWEIDA, GERMANY.

APPARATUS FOR HARDENING THE TEETH OF CARD-CLOTHING.

No. 840,090.   Specification of Letters Patent.   Patented Jan. 1, 1907.

Application filed May 8, 1906. Serial No. 315,747.

*To all whom it may concern:*

Be it known that I, LOUIS CONSTANTIN SCHNEIDER, a citizen of the United States of America, and a resident of Südstrasse 9, Mittweida, Kingdom of Saxony, German Empire, have invented new and useful Improvements in Apparatus for Hardening the Teeth of Card-Clothing, of which the following is a specification.

The present invention relates to improvements in apparatus for hardening the teeth of card-clothing. The difference between the present invention and the known means and apparatus which are used for this purpose, wherein the card-clothing with its projecting teeth is passed into a hardening or water bath after the teeth have been heated to redness, is that according to the present invention the quantity of liquid employed for hardening the teeth is controlled or regulated according to the extent or length to which the teeth are to be hardened. This is effected by means of an endless traveling surface of velvet, plush, or the like, damped with the hardening liquid to the extent required. Further, this liquid is brought as near as possible to the spot where the teeth are heated to redness and the red-hot teeth themselves are not passed through the hardening liquid. According to the present invention this object is obtained as follows: An endless band is passed round a drum which revolves in the hardening liquid, or the surface of the drum itself may be moistened with the liquid, and the liquid itself is brought as near as possible to the spot where the teeth are heated to redness, so as to attain the end aimed at in all hardening processes—viz., to prevent the teeth cooling off before they reach the hardening bath.

The endless band which carries the hardening liquid to the points of the heated teeth is saturated with liquid by the rotation of the drum. In order to regulate and determine the degree of saturation or moistening according to the extent or length to which the teeth-points are to be hardened, an adjustable blade or roller is arranged to contact with the flexible endless band as it rises from the liquid, and thus remove so much of the liquid as is superfluous for hardening the points of the teeth to the length desired. The nature or quality, however, of the band itself, which is preferably of a plush-like material, determines to some extent the length to which the hardening of the teeth is performed. The traveling endless band can also be made to pass round an adjustable bar of wedge-shaped section or round an adjustable roller, so as to introduce the moistened band as closely as possible between the points of teeth and the mouth of the nozzle which emits the heating-jet. If instead of the traveling band the surface of the immersed drum itself is used for conveying the hardening liquid, in this case also the quantity of moisture carried by the surface is regulated by means of an adjustable blade or roller arranged to come into contact with the surface of the drum.

In the accompanying drawings, Figure 1 represents in section a hardening apparatus constructed according to the present invention. Fig. 2 shows part of a hardening apparatus of a modified form, and Fig. 3 part of another modification of such apparatus.

Referring to Fig. 1, $a$ is a brake device under which the strip of card-clothing $d$ is passed, first onto an endless band $b$ and hereinafter round a guiding-drum $c$. During such traveling the teeth of the card-clothing $d$ are subjected in known manner to a flame of gas issuing from a nozzle $e$. $f$ is a receptacle or trough which contains the hardening liquid, and $g$ a drum journaled in this receptacle or trough $f$. An endless flexible band $j$, which passes round the drum $g$, travels through the hardening liquid as the drum revolves. This band thus saturated is led in the direction of the arrow $h$ to meet the card-clothing $d$. $i$ is a bar of wedge-shaped section round which the band saturated passes to return hereinafter to the trough. $k$ $l$ are a pair of rollers which serve to insure the proper pressure of the moistened endless band $j$ against the heated teeth-points of the card-clothing. $m$ is a blade arranged to press against the surface of the flexible band, so as to regulate or control the quantity of liquid which it carries. This blade $m$ removes the superfluous liquid and returns it to the trough $f$. The blade $m$ is adjustably arranged in a bearing on the flange of the trough, so as to determine exactly the quantity of liquid conveyed to the points of the carding-teeth, and consequently the extent or length to which they are to be hardened. The beveled form of the bar $i$, round which the endless yielding band $j$ passes, allows such band to be brought quite close up to the nozzle $e$, so as to reduce to a minimum the space between the heating and hardening positions, and thus prevent the heated teeth-points from cooling off before they come into contact with the band $j$, conveying the hardening liquid. By the adjustment of the bar $i$ against the points of the teeth the length to which the latter are to be hardened may be regulated as well as by the quantity of liquid conveyed by the traveling band.

In the modified form shown in Fig. 2 an adjustable roller $n$ is employed instead of the adjustable bar $i$. In this case an adjustable blade $m$ may also be arranged to press upon the band $j$ to regulate the quantity of liquid conveyed by it.

Fig. 3 shows another modification of the apparatus represented in Fig. 1. According to such modification the drum $q$ itself may be used for this purpose instead of the traveling band. In this case the blade $m$, adjustably mounted on the flange of the trough $f$, is applied or pressed directly to the surface of the drum rotating within the trough in order to remove any superfluous liquid therefrom. The surface of such drum may advantageously consist of a covering $o$, adapted to take up the hardening liquid.

The results actually obtained by the apparatus described are, shortly, as follows: First, the carding-teeth which it is desired to harden are not passed through the hardening liquid; second, the hardening liquid is conveyed to the points of the teeth by means of a saturated surface and is uninterruptedly applied to them immediately behind the spot where they are heated to redness, so that a continuous fresh supply of hardening liquid is led to the teeth-points, and, third, the degree of saturation of the band or roller with the liquid which is to be conveyed to the teeth can be exactly regulated and determined according to the length to which the teeth are to be hardened.

What I claim is—

1. In an apparatus for hardening teeth of card-clothing, the combination with means for feeding said clothing, of a receptacle containing the hardening liquid, means for heating the teeth, means for supplying the hardening liquid from the receptacle to the heated teeth and means for controlling the supply of the hardening liquid to the teeth, substantially as and for the purpose specified.

2. In an apparatus for hardening teeth of card-clothing, the combination with means for feeding said clothing, of a receptacle containing the hardening liquid, means for heating the teeth, an endless yielding band conveyer for supplying the hardening liquid from the receptacle to the heated teeth and means for controlling the supply of the hardening liquid to the teeth, substantially as and for the purpose specified.

3. In an apparatus for hardening teeth of card-clothing, the combination with means for feeding said clothing, of a receptacle containing the hardening liquid, means for heating the teeth, an endless yielding band conveyer of pile fabric for supplying the hardening liquid from the receptacle to the heated teeth to be hardened and means for controlling the supply of the hardening liquid to the teeth, substantially as and for the purpose specified.

4. In an apparatus for hardening teeth of card-clothing, the combination with means for feeding said clothing, of a receptacle containing the hardening liquid, means for heating the teeth, an endless band conveyer for supplying the hardening liquid from the receptacle to the heated teeth, and an adjustable bar for adjusting the upper end of the band conveyer against the heated teeth to be hardened, substantially as and for the purpose specified.

5. In an apparatus for hardening teeth of card-clothing, the combination with means for feeding said clothing, of a receptacle containing the hardening liquid, means for heating the teeth, an endless band conveyer for supplying the hardening liquid from the receptacle to the heated teeth, an adjustable bar for adjusting the upper end of the band conveyer against the heated teeth to be hardened and an adjustable blade for controlling the supply of the hardening liquid before reaching the teeth, substantially as and for the purpose specified.

6. In an apparatus for hardening teeth of card-clothing, the combination with means for feeding said clothing, of a receptacle containing the hardening liquid, a gas-burning nozzle for heating the teeth, an endless yielding band conveyer of pile fabric for supplying the hardening liquid from the receptacle to the heated teeth, an adjustable bar for adjusting the upper end of the band conveyer against the heated teeth to be hardened and an adjustable blade for controlling the supply of the hardening liquid before reaching the teeth, substantially as and for the purpose specified.

7. In an apparatus for hardening teeth of card-clothing, the combination with an endless band for feeding said clothing, of a receptacle containing the hardening liquid, a gas-burning nozzle for heating the teeth, an endless yielding band conveyer of pile fabric for supplying the hardening liquid from the receptacle to the heated teeth, an adjustable bar for adjusting the upper end of the band conveyer against the heated teeth to be hardened, and an adjustable blade for controlling the supply of the hardening liquid before reaching the teeth, substantially as and for the purpose specified.

In testimony that I claim the foregoing as my invention I have signed my name, in presence of two witnesses, this 20th day of April, 1906.

LOUIS CONSTANTIN SCHNEIDER.

Witnesses:
FREDERICK J. DIETZMAN,
LEOPOLD MATTHIAE.